(12) United States Patent
Houston et al.

(10) Patent No.: US 6,582,023 B2
(45) Date of Patent: Jun. 24, 2003

(54) VEHICLE SEAT WITH A SIDE CARRIER AND A BUCKLE

(75) Inventors: Robert Houston, Leichlingen (DE); Burckhard Becker, Solingen (DE)

(73) Assignee: C. Rob. Hammerstein GmbH & Co. KG (DE)

( * ) Notice: Subject to any disclaimer, the term of this patent is extended or adjusted under 35 U.S.C. 154(b) by 0 days.

(21) Appl. No.: 09/975,599

(22) Filed: Oct. 11, 2001

(65) Prior Publication Data
US 2002/0047296 A1 Apr. 25, 2002

(30) Foreign Application Priority Data

Oct. 25, 2000 (DE) .......................... 100 52 949

(51) Int. Cl.[7] .................................. B60N 2/42
(52) U.S. Cl. .................... 297/470; 297/216.1; 297/472
(58) Field of Search .............. 297/216.1, 470, 297/472; 248/157, 421, 423

(56) References Cited

U.S. PATENT DOCUMENTS

| | | | |
|---|---|---|---|
| 4,487,454 A | | 12/1984 | Biller |
| 4,738,427 A | * | 4/1988 | Nishino ........................ 248/421 |
| 4,790,597 A | | 12/1988 | Bauer et al. |
| 5,282,672 A | * | 2/1994 | Borlinghaus ................. 297/468 |
| 5,366,269 A | * | 11/1994 | Beauvais ................. 297/216.19 |
| 5,567,006 A | * | 10/1996 | McCarthy ................. 297/216.15 |
| 6,116,689 A | * | 9/2000 | Bauer et al. ............. 297/344.15 |
| 6,467,849 B1 | * | 10/2002 | Deptolla .................... 297/464 |

* cited by examiner

Primary Examiner—Peter M. Cuomo
Assistant Examiner—Joseph Edell
(74) Attorney, Agent, or Firm—Akerman Senterfitt

(57) ABSTRACT

The vehicle seat has a seat carrier and an underframe. The underframe comprises two bottom rails, two seat rails, two front supports, and two rear pivoting supports. A buckle of a safety belt is provided. Tensile loads acting on the buckle are transferred into the underframe. The bottom rail neighboring the buckle is provided with a side part that extends upward toward the seat carrier. A slot is configured in this side part and is oriented substantially transversely to a direction of a force acting on the buckle during of a frontal crash. A sliding member is provided and is guided in the slot. A pull-type strap is arranged between the buckle and the sliding member. A connecting rod is arranged between the neighboring rear pivoting support and the sliding member. Whenever the seat carrier is adjusted in height, the neighboring rear pivoting support is pivoted and the connecting rod displaces the sliding member in the slot, causing the buckle to follow the movement of the seat carrier.

11 Claims, 2 Drawing Sheets

VEHICLE SEAT WITH A SIDE CARRIER AND A BUCKLE

Figure 1:
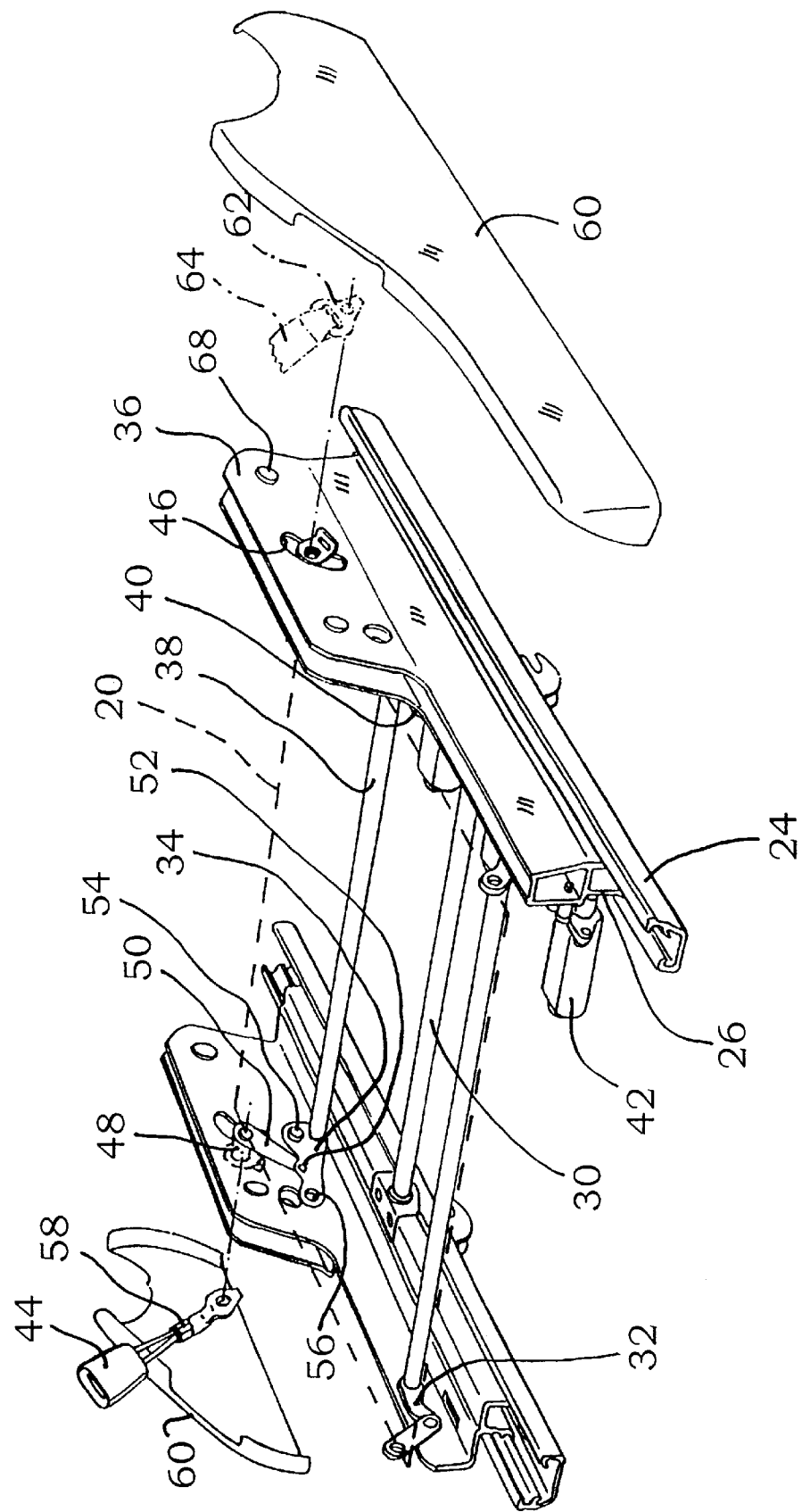

The invention relates to a vehicle seat with a) a seat carrier that receives a seat upholstery, with b) an underframe that is fitted with a longitudinal adjusting device with two couples of rails that are provided with a bottom rail and a seat rail each, and moreover with two front supports and two rear pivoting supports, a height adjusting mechanism being allocated to the rear pivoting supports, the front supports and the rear pivoting supports carrying the seat carrier and with c) a buckle of a safety belt that is connected to the underframe by way of a pull-type strap, so that tensile loads acting on the buckle are led into the underframe and wherein positioning means are furthermore provided for, said positioning means being assigned to the buckle and altering the position thereof upon height adjustment of the seat carrier.

With height-adjustable seat carriers it is state of the art to have the vertical position of the buckle of a safety belt adjusted subsequently. Reference is made to EP 0 265 747 B1 and to DE-A-32 16 015 which both disclose the features of a vehicle seat as set forth herein above.

In principle, these previously known devices have proved efficient. They also have found widespread use in practice. It is an object of the invention to indicate another solution for a buckle that follows the seat carrier in its vertical move. It is therefore a particular object of the invention to indicate such a buckle together with its component parts that is suited for a seat with integrated belt, i.e., that also permits a ferrule located at the other end of the lap part of a safety belt to be carried along. This communicated motion is to be synchronized for the two seat sides.

In view of the vehicle seat of the type mentioned herein above, the solution to this object is to provide the bottom rail neighboring the buckle with a side part that extends upward toward the seat carrier, to configure a slot in said side part, said slot being oriented substantially transversely to a direction of a belt load exerted by the belt buckle in the event of a frontal crash of the vehicle in which the vehicle seat is located, to provide for a sliding member which is guided in said slot and onto which the pull-type strap of the buckle is acting and to have the positioning means designed as a connecting rod that is attached on one side to the neighboring rear pivoting support and on the other side to the sliding member and that displaces the sliding member within the slot when the rear support describes a pivoting movement.

The position of the buckle is defined by the fact that the position of the sliding member inside the slot is altered when the seat carrier is being adjusted in height. As a result thereof, the buckle, which is firmly attached to the sliding member, is carried along in vertical direction. The sliding member is positioned in the slot by having it connected to the corresponding rear pivoting support by way of the connecting rod.

A very simple construction of a follower safety belt is made possible by the invention. This construction is extremely safe since the sliding member is guided within the slot and abuts direct on the slot without the need for any safety catch or safety contrivance whatsoever to intervene when the belt is loaded on account of an accident. The only point is that, in the event of an accident, the sliding member remains caught within the slot and that the corresponding components parts take all the belt loads occasioned by the accident. Accordingly, no safety contrivances whatsoever are to be overcome, such contrivances permitting the buckle to move freely first and being only destroyed or eliminated in another way in the event of an accident. Another advantage lies in the fact that the tensile loads of the belt are immediately led into the bottom rail to which the side part is connected.

In a preferred embodiment, the two rear pivoting supports are non-rotatably linked to each other by way of a tie bar. The other bottom rail, which is located on another side of the seat than the buckle, is provided with a side part that also has a slot with a sliding member, on which an end ferrule of a lap belt is acting, allocated thereto. This other seat side has a connecting rod as well. This configuration is particularly suited to so-called seats with integrated belt in which the lap belt is accordingly connected to the seat by its two ends. The motion of the two sliding members of each seat side within the respective slot is synchronized by the fact that the two rear pivoting supports are non-rotatably linked to each other by way of a tie bar.

In another advantageous embodiment, the slot describes a curve whose center is preferably located in a region located in opposite direction relative to the buckle. In other words, it is located in opposite direction relative to the direction of the belt load acting on the sliding member. In principle, the shape of the slot is purely one of choice. It may be adapted to the kinematics of the height adjustment. The shape of the slot is chosen to achieve an optimum position of the buckle in each and every single vertical adjustment position of the seat carrier.

In another advantageous embodiment, the rear pivoting support is on one side hinge-connected in a direct or indirect fashion to the corresponding bottom rail in a lower swivel joint and on the other side to the seat carrier in an upper swivel joint. The connecting rod is connected to the rear pivoting support at a hinge point that is located between the lower hinge point and the upper hinge point. By selecting the hinge point, the following height adjustment of the buckle may be kinematically optimized. Together with the shape of the slot that has just been mentioned, the selecting of a hinge point located nearer to the lower or to the upper hinge point of the rear pivoting support permits to achieve favorable kinematic properties.

It is furthermore advantageous to have each side part provided with two parallel lateral metal sheets that are both connected to the seat rail and are provided with their own slot each. Higher stability is thus achieved.

Furthermore, the sliding member is well guided thanks to the spacing of the two lateral metal sheets. In the event of an accident, tensile loads of the belt are favorably absorbed.

It moreover proved advantageous to non-rotatably connect the pull-type strap to the connecting rod. With a sliding member that is capable of rotating within the slot, this is achieved by the fact that the buckle cannot be rotated about the sliding member.

In a preferred development, the side part has a bearing means for directly fastening a seat back of the vehicle seat to the underframe. Thus, vehicle seats can be realized, in which a seat back is fastened directly to the underframe and in no case to the seat carrier. In principle, the invention is also suited to seat backs that are arranged on the seat carrier.

Further advantages and characteristics of the invention will become apparent in the claims and in the following description of two exemplary embodiments of the invention that are not limiting the scope of the invention and are explained in more detail with reference to the drawing.

Figure 2:
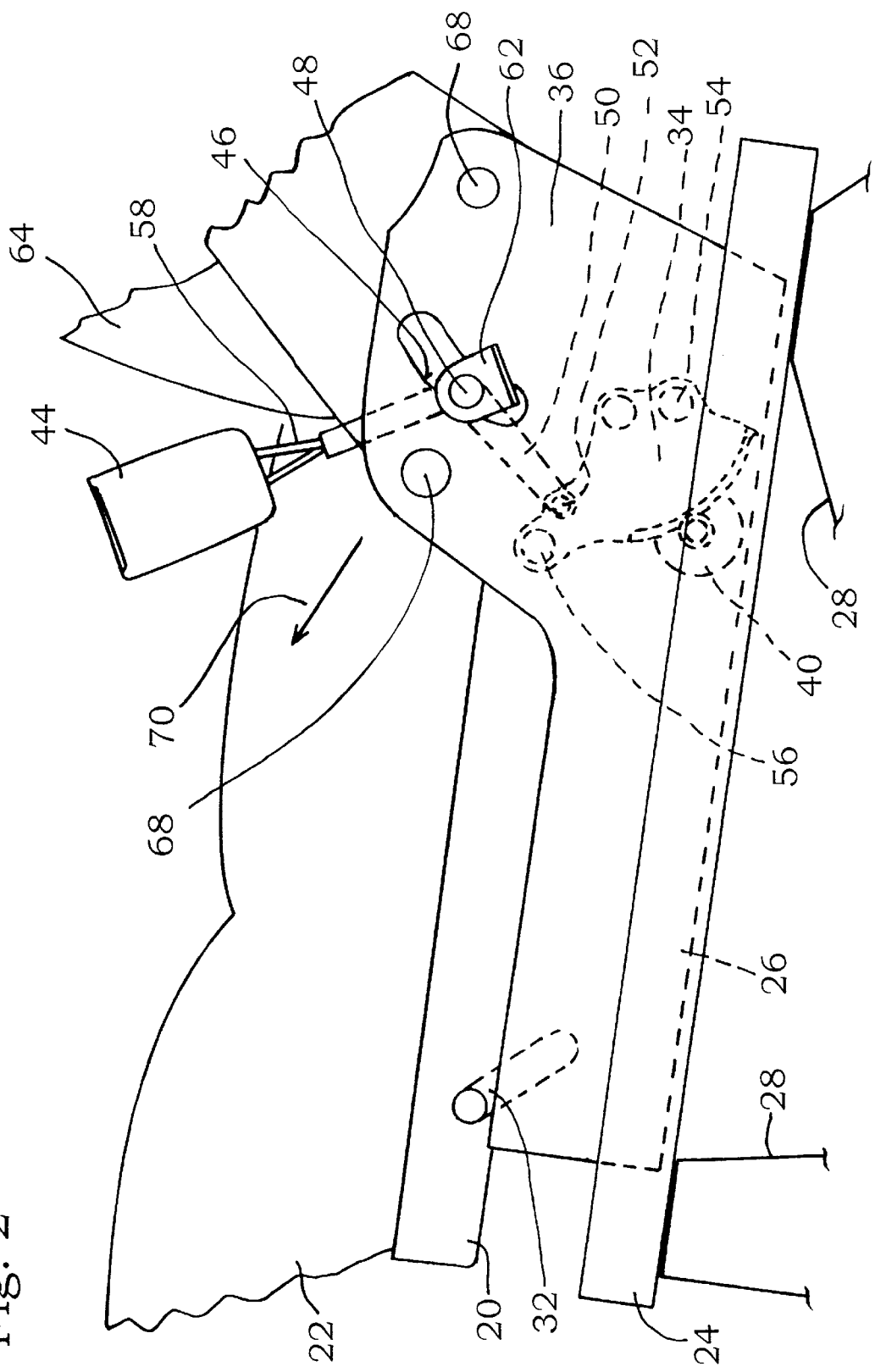

FIG. 1 shows a vehicle seat with an underframe, a buckle, an outlined seat carrier and an outlined seat back, all of them in a perspective view and FIG. 2 shows a side view of a vehicle seat similar to FIG. 1.

As shown in FIG. 1, the vehicle seat has a seat carrier 20 shown in dashed outline which receives and supports a seat upholstery 22 that is shown here in dashed outline as well. Here, seat carrier 20 and seat upholstery 22 are shown in schematic form only for the purpose of providing free view onto the essential parts that are explained herein after.

The vehicle seat also has an underframe. It has a longitudinal adjusting device with two couples of rails. Each couple of rails has a bottom rail 24 and a seat rail 26. As can be seen from FIG. 2, each bottom rail 24 is connected to an underbody 28 of a vehicle, two supporting brackets being shown in FIG. 2.

The two seat rails 26 are connected to one another by way of a transverse unit 30. Said transverse unit transmits a motor-driven longitudinal adjustment of one couple of rails to the other. In an alternative that has not been presented here the longitudinal adjustment is conducted by hand, the state of the art with respect to these adjustments and to the motor-driven longitudinal adjustments as well being extensive, so that it is not necessary to explain them in detail.

The underframe has furthermore two front supports 32 which are configured here as double arms and two rear pivoting supports 34. These front supports 32 and rear pivoting supports 34 are each rotatably carried on one side part 36 which, in the embodiment shown, is integral part of the corresponding seat rail 26. In another embodiment, it is a separate component part and is rigidly connected to the seat rail 26 allocated thereto.

The two rear pivoting supports 34 are hinge-connected by way of a tie bar 38. The adjustment of the two rear pivoting supports 34 is carried out by way of an electric motor 40 fitted with the corresponding mechanism. Such height adjustment mechanisms are actually known, the relevant prior art is extensive.

Alternatively, the two front supports 32 may also be configured in a way different from the one as shown in the two Figures. Simple pivoting supports may for example be utilized, a slot guide may be provided, and so on. The related prior art is again extensive, and is referred to.

At their respective upper free ends, the two front supports 32 and the two rear pivoting supports 34 have bores for receiving the seat carrier 20. Hinge pins or other means for providing a connection to the seat carrier 20 may be provided instead of the bores. The crucial point is that the seat carrier 20 is hinge-connected to all of the four supports 32, 34.

In the exemplary embodiment shown, the height of the front edge of the seat can be adjusted separately. An electric motor 42 is provided for the purpose. The separate adjustment of the height of the front edge of the seat is a feature that is, in principle, not needed to realize the invention but that may be given.

In FIG. 1, the two seat rails 26 are each fitted with side parts 36. The side part 36 of the couple of rails represented on the left side in FIG. 1 is clearly arranged outward before it extends upward. The misalignment amounts to several centimeters, e.g., 2 to 8 cm. It is located on the side of the seat on which a buckle 44 is also provided. The side part 36 of the other, left seat side, by contrast, is located directly above the corresponding bottom rail 24. Accordingly, no misalignment is provided for in this case.

The two side parts have in common that they project further upward in their rear region than in the front region. Between the front and the rear, a step is realized. The side parts 36 are duplicated at least in the rear region where they are formed by two paralleled plates. The spacing amounts to approximately 1 through 3 cm. There, a slot shaped like an arcuate long hole is also provided. A sliding member 48 that is slidably guided in the slot extends across each of said slots 46. On either side of the seat it is connected to a connecting rod 50 that is hinge-connected on a hinge point 52 of the corresponding rear pivoting support 34, said hinge point being located between a lower hinge point 54 and an upper hinge point 56. In the embodiment shown it is approximately in the center between the two hinge points 54, 56. On the lower hinge point 54, the corresponding rear pivoting support 34 is hinge-connected to the side part 36. The hinge connection to the seat carrier 20 takes place at the upper hinge point 56. The tie bar 38 is positioned at a distance from the lower hinge point, but close to it. The tie bar may also have the same axis than the lower hinge point 54.

In the embodiment shown, the sliding member 48 is rotatable within the slot 46. In order to prevent the sliding member 48 from rotating, the connecting rod 50 is rigidly connected to the sliding member 48. In another embodiment, the sliding member 48 is not round as shown, but so noncircular that it cannot rotate within the slot 46.

On the outer side of the vehicle seat, a pull-type strap 58 that is also nonrotatably connected to the sliding member 48 shown in FIG. 1 is attached to said sliding member 48. It carries the buckle 44. In FIG. 1 there is also provided an external cap 60 that covers the outside of the rear, upper region of the side part 36 and the pull-type strap 58 and that protects the mechanic parts.

On operating the electric motor 40, the position of the two rear pivoting supports 34 is altered. The position of the two sliding members 48 is altered inside the respective slot 46 by the connecting rods 50 of each seat side that are oriented substantially transversely to said two pivoting supports 34. As a result thereof, the position of the buckle 44 located on the right seat side is altered as well. On the left seat side, the position of an end ferrule 62 to which is fastened the end of the lap belt 64 that is a component part of the safety belt which is not illustrated in detail is altered in the same way and to the same extent.

A seat back 66 is fixed to assembly means 68 provided on the side parts 36. Accordingly, the seat back is arranged directly on the underframe. But it is absolutely possible, within the scope of the invention, to fasten the seat back to the seat carrier.

For emphasis it is stated once more that FIG. 2 shows a preferred embodiment in which the two sides of the vehicle seat have been provided with the device according to the invention for subsequently adjusting the position of the fastening points of the lap belt 64. It is absolutely possible and even provided for that but one seat side be realized according to the invention.

This is particularly the case when the end ferrule 62 for the lap belt 64 is not fastened on the vehicle seat, but on the vehicle itself e.g., on the underbody 28. In this event, the seat side facing the center of the vehicle only is configured according to the invention.

In principle though, it is also possible to only subsequently adjust the end ferrule 62 and to fasten the buckle 44 somewhere else, more specifically by positioning it by way of a device for subsequent adjustment as it has been known in the art mentioned herein above.

FIG. 2 shows further constructive details of the already discussed solution. In FIG. 2, elements that correspond to elements in FIG. 1 bear the same reference numerals.

If, surveying the FIGS. 1 and 2, the impression arises that the direction in which the pull-type strap 58 and accordingly the end ferrule 62 are positioned relative to the respective slot 46 is not substantially perpendicular, it has to be taken into consideration that the pull-type strap is in its position of use. A belt load occasioned by an accident acts at a flatter angle which is indicated by an arrow 70.

As shown in the Figures, the connecting rod 50 and the orientation of the slot 46 are inclined to each other with an angle as acute as possible. I.e., the smallest possible angle. As a result thereof, a translatory motion of the connecting rod 50 substantially causes the sliding member 48 to be displaced and does not load the slot 46 across the direction of displacement.

What is claimed is:

1. A vehicle seat comprising in combination a) a seat carrier, said seat carrier carrying a seat upholstery, b) an underframe comprising a longitudinal adjusting device which longitudinal adjusting device has two pairs of rails, each of said two pairs of rails having a bottom rail and a seat rail, two front supports and two rear pivoting supports, said two front supports and two rear pivoting supports carrying the seat carrier, and a height adjusting mechanism, said height adjusting mechanism being allocated to the rear pivoting supports, c) a buckle of a safety belt, and d) positioning means, said positioning means being attached to the buckle and adapting the position of the buckle relative to the seat frame during a height adjustment of the seat carrier, wherein the bottom rail neighboring the buckle is provided with a side part, said side part extending upward toward the seat carrier, a slot is provided in said side part, said slot being oriented substantially transversely to a direction of a belt force acting on the buckle during a frontal crash of a vehicle in which the vehicle seat is located, a sliding member is provided, said sliding member being guided in the slot, a strap being provided, said strap linking the sliding member with the buckle, so that a tensile load acting on the buckle is transferred into the sliding member of the underframe, the positioning means includes a connecting rod wherein the connecting rod has two sides and is attached on one of said two sides to the neighboring rear pivoting support and on the other of said two sides to the sliding member, said connecting rod displacing the sliding member within the slot during a pivoting movement of said rear pivoting support.

2. The vehicle seat according to claim 1, wherein a tie bar is provided, said tie bar linking the two rear pivoting supports, the vehicle seat has two sides, the buckle being arranged on one of said two sides, the bottom rail located on the side of the seat opposite to the buckle is also provided with a side part, which side part also has a slot, a sliding member is provided in said slot, an end ferrule of a lap belt is provided, said end ferrule being attached to the sliding member, and a connecting rod is provided between the neighboring rear pivoting support and the sliding member.

3. The vehicle seat according to claim 1, wherein the slot describes a curve.

4. The vehicle seat according to claim 3, wherein the curve has a center, which center is positioned in a region, the slot being located between said region and the buckle.

5. The vehicle seat according to claim 4, wherein the slot is arranged between the fastening points.

6. The vehicle seat according to claim 1, wherein the connecting rod is connected to the neighboring rear pivoting support at a hinge point that is located between a lower hinge point and an upper hinge point of said neighboring rear pivoting support.

7. The vehicle seat according to claim 1, wherein the each side part is provided with two parallel lateral metal sheets that are both connected to the neighboring seat rail and are provided with an own slot each.

8. The vehicle seat according to claim 1, wherein the strap is non-rotatably connected to the connecting rod.

9. The vehicle seat according to claim 1, wherein the side part has a bearing means for a seat back of the vehicle seat.

10. The vehicle seat according to claim 9, wherein the bearing means are configured as fastening points and wherein the slot is arranged in proximity of the fastening points.

11. The vehicle seat according to claim 1, wherein the side part of one seat side part of said one side is located substantially above the neighboring seat rail whereas on the other side of the seat the side part of said other seat side is shifted in an outward direction above the neighboring seat rail.

* * * * *